United States Patent [19]
Lee

[11] Patent Number: 5,433,818
[45] Date of Patent: Jul. 18, 1995

[54] APPARATUS FOR TURNING A SHEET-LIKE WORKPIECE

[75] Inventor: John Lee, Sandy, England

[73] Assignee: Willan Design Limited, Stevenage, England

[21] Appl. No.: 52,056

[22] PCT Filed: Oct. 21, 1991

[86] PCT No.: PCT/GB91/01841

§ 371 Date: Apr. 13, 1994

§ 102(e) Date: Apr. 13, 1994

[87] PCT Pub. No.: WO92/07161

PCT Pub. Date: Apr. 30, 1992

[30] Foreign Application Priority Data

Oct. 22, 1990 [GB] United Kingdom ............... 9022911

[51] Int. Cl.$^6$ .................. B29C 65/00; B29C 65/54; B65G 47/244; B65G 47/91
[52] U.S. Cl. ............................. 156/576; 156/107; 156/109; 156/285; 156/361; 156/578; 198/379; 198/468.4; 414/737; 901/6; 901/16; 901/40
[58] Field of Search ............... 156/99, 102, 105, 106, 156/107, 109, 285, 361, 378, 556, 574, 576, 578, 391; 414/737, 752, 676, 736, 627; 901/6, 16, 46; 198/379, 468.4, 471.1, 689.1, 803.5

[56] References Cited

U.S. PATENT DOCUMENTS

| | | | |
|---|---|---|---|
| 3,598,263 | 8/1971 | Ehmke | 414/737 X |
| 3,613,904 | 10/1971 | Blatt | 414/737 |
| 3,838,803 | 10/1974 | Berry | 414/676 X |
| 3,876,489 | 4/1975 | Chenel | 414/736 X |
| 4,228,993 | 10/1980 | Cathers | 198/468.4 X |
| 4,298,307 | 11/1981 | Bergman | 198/379 X |
| 4,444,537 | 4/1984 | Werner | 414/737 X |
| 4,561,929 | 12/1985 | Lenhardt | 156/99 X |
| 4,648,779 | 3/1987 | Weitzman | 414/676 |
| 4,805,950 | 2/1989 | Haroutel et al. | 414/737 X |
| 4,846,625 | 7/1989 | Gabillet | 414/737 |
| 4,863,340 | 9/1989 | Masunaga et al. | 414/737 X |
| 4,961,816 | 10/1990 | Lisec | 156/107 X |
| 5,051,145 | 9/1991 | Lenhardt | 156/107 X |
| 5,088,188 | 2/1992 | Riou | 156/107 X |
| 5,131,349 | 7/1992 | Keller et al. | 156/578 X |
| 5,167,756 | 12/1992 | Lenhardt | 156/107 X |

*Primary Examiner*—Michael W. Ball
*Assistant Examiner*—Francis J. Lorin
*Attorney, Agent, or Firm*—Dennis T. Griggs

[57] ABSTRACT

Apparatus for turning a sheet-like workpiece, e.g. a rectangular sheet of glass, and for applying a sealing strip continuously along its edges, includes an air flotation/section support bed (14, 15) covered by an air-permeable mat (16), a sealing strip applicator (32, 59) on a carriage (33), suction cup assemblies (63, 72) mobilely mounted on respective mutually perpendicular slides (24, 25) for gripping the sheet (22) at two adjacent corners thereof, the movement of the assemblies (63, 72) being coordinated such that, while gripping the sheet (22), one assembly (72) is moved towards the initial position of the other assembly (63) and simultaneously the latter (63) is moved towards the corner diagonally opposite the corner at which the first assembly (72) was initially disposed.

10 Claims, 4 Drawing Sheets

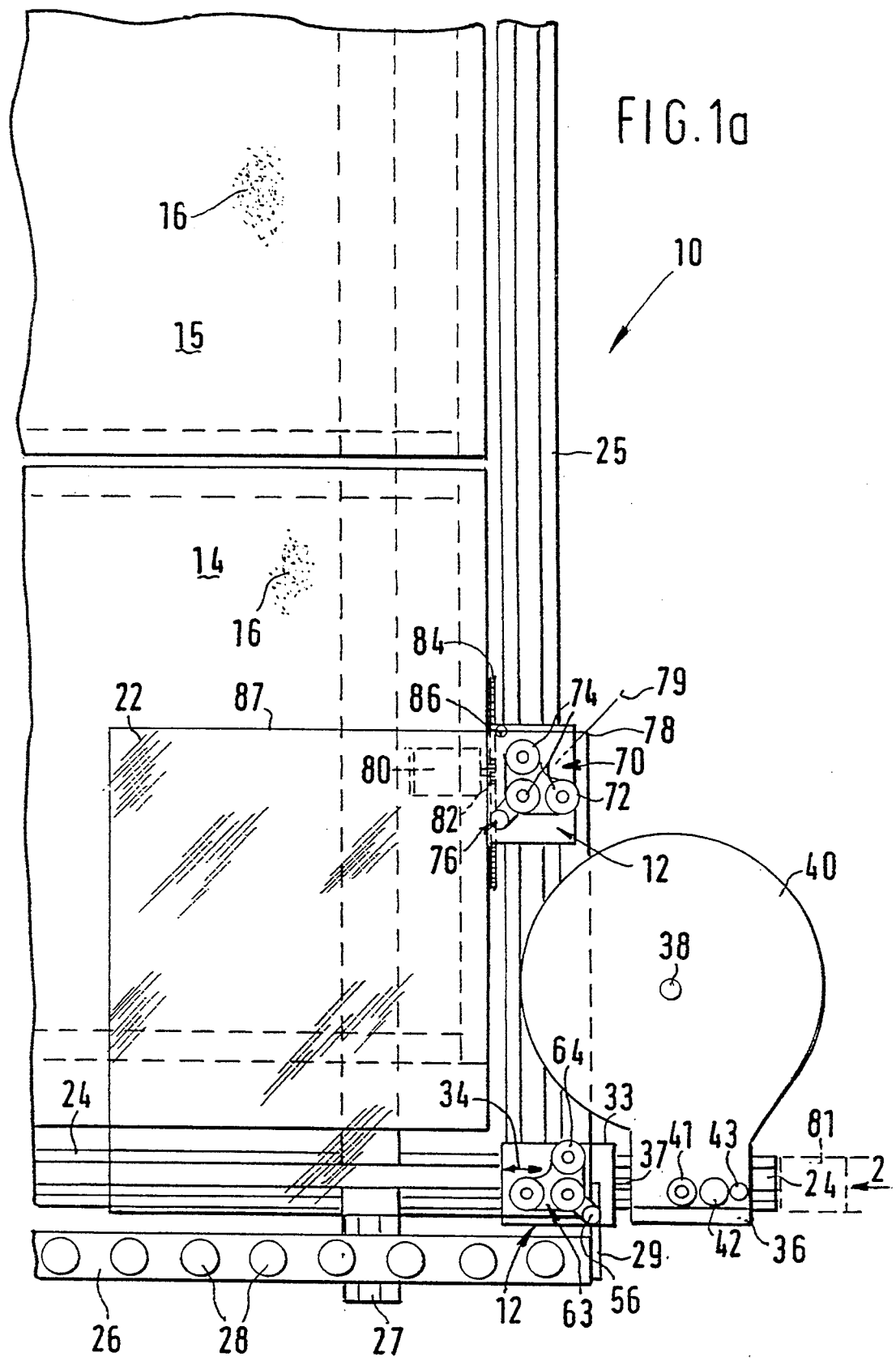

APPARATUS FOR TURNING A SHEET-LIKE WORKPIECE

FIELD OF THE INVENTION

The invention concerns apparatus for turning a sheet-like workpiece; it also concerns apparatus for applying a strip of material to the sides of such a workpiece.

Although the invention is not so restricted, it will hereafter be particularly described with reference to such apparatus forming part of a machine line for producing sealed units of glass, using a sealant known as the TREMCO "Swiggle Strip" manufactured by TREMCO Manufacturing, Inc. Such a sealing strip is a butyl-based thermoplastic sealant mass, usually sold in reel form with a peelable backing sheet and contains both a band of corrugated metal acting as a spacer and stifleher, and a desiccant. It is tacky to the touch at room temperature.

BACKGROUND

In one known machine line manufactured by ourselves, a first sheet of rectangular glass is washed, in a vertical position, in a special washing machine, rinsed, dried and passed to a so-called tilt applicator. The tilt applicator is a ball castor table which has a pneumatic mechanism for moving the glass sheet from a vertical arrival position to a horizontal working position in which the sealing strip is applied to the perimeter of the sheet. Next, another like sheet is placed on the strip, and then the assembly of two sheets with the sealing strip therebetween is passed to a roller press where it is heated to soften the sealant and compressed.

This known machine line works well and has enjoyed appreciable commercial success. Nevertheless, it is recognized that the tilt applicator, being manually operated, is not as productive as it might be. Moreover, the application of the sealing strip, also being a manual operation, requires a high level of operator skill and concentration.

Still further, the sealing strip is a component that, ideally, should not be handled at all. Thus the moisture in the form of perspiration which is inevitably present on the operator's fingers is apt to close the pores of the sealing strip which may reduce the effectiveness of the desiccant and/or deposit grease where the sealing strip is in contact with the glass; these factors could lead to the rejection of the assembled unit because of the appearance of moisture between the internal faces of the sheets of the unit and/or a reduction in the quality of the seal between the sealing strip and the glass.

Also, sealing strip is supplied in a variety of widths for correspondingly varying spacing between the two sheets of a sealed unit, and the wider the strip the more difficult it is for the operator to manipulate it and to apply it in a straight line.

In our known tilt applicator the glass sheet is rotated by hand in order to apply the sealing strip to all four sides of it and it would be desirable to provide mechanised turning in order to increase productivity.

DISCLOSURE OF THE INVENTION

The present invention seeks to improve the known tilt applicator by providing apparatus which:

for smaller sheets of glass retains the simplicity and convenience of manual rotation of the glass but for larger sheets provides the option of a highly accurate turning mechanism which presents the four sides of the glass in succession to a specific datum position for the application of the sealing strip;

provides a very simple path from a reel of sealing strip to the point of application, thus avoiding problems associated with the tackiness of the sealing strip and its separation from its backing sheet;

provides a reliable semi-automatic means for adhering the sealing strip to glass but not to the applicator;

enables sealing strip to be applied conveniently around sharp corners;

minimises contact between operator (or machine) with the edges or the insides of the glass sheet assembly, whereby to avoid leaving visible marks and also avoiding the wear caused to anything that touches the edges of glass;

can accommodate a wide variety of sealing strip dimensions; and reduces the number of operators, and their required skill levels, for a given desired output.

According therefore to the present invention, there is provided apparatus for turning a sheet-like workpiece, comprising supporting means for supporting the workpiece in a given plane, respective mobile gripping means which are selectably activatable to grip or release adjacent corner regions of the said workpiece, means defining mutually orthogonal, linear displacement paths for said mobile gripping means, and means for effecting linear displacement of said gripping means along said paths while being activated to grip the said workpiece.

Preferably, an applicator of material of strip form is mounted on one of said paths for movement therealong selectably with or independently of the gripping means associated with said path, the said applicator being operable to apply an initial strip of material along one edge of said workpiece by moving in a first direction from one corner region of said workpiece to the opposite corner region along said edge.

Means may be provided to keep the said applicator stationary relative to said opposite corner region while said gripping means are activated.

For supporting the sheet-like workpiece while also facilitating its manipulation, the supporting means is preferably a support bed for holding the said workpiece in a horizontal position and is provided with a plurality of air flow apertures.

In the preferred variant of the invention, the apertures of the support bed are connected to a change-over valve selectively connectible to a source of suction or to a blower, and control means are so to control said valve and said gripping means that when the support bed is connected to the blower to air-float the said workpiece the said gripping means are activated.

Thus, the support bed may function as an air flotation bed or as an air suction bed and may be associated with a plurality of suction cups constituting said gripping means.

Preferably, there are at least two of said suction cups mounted on respective slideways disposed mutually orthogonally to other. At least one of the suction cups is either mechanically driven or is manually displaceable while at least one other suction cup is connected to be driven, e.g. by a stepper motor, on a carriage which carries a sensor to detect the position of an edge of the workpiece.

Conveniently, the gripping means, i.e. suction cups, are grouped into two assemblies of three, each trio being mounted in a cloverleaf configuration for pivotal movement about an axis passing perpendicularly through a corner region of said workpiece, as well as being preferably reciprocatable orthogonally towards and away the plane of said workpiece.

Advantageously, the applicator includes a first roller freely rotatable about an axis perpendicular to the plane of said sheet, a pin parallel with said axis and defining a gap between itself and said first roller, and a second roller rotatable about an axis parallel with the plane of the sheet, the second roller being raisable and lowerable respectively to release and engage with pressure the said strip material.

Expediently, for improving the properties of the support bed both in the suction mode and in the air flotation mode, it is covered by a porous mat of special material. This has the advantages of better distributing the air flow, protecting the apertures from ingress of foreign material and clogging and also protecting the bed surface generally from accidental damage, scratches, etc.

According to another aspect of the invention, the preferred mat is a mat made from a fibrous fabric, e.g. a mixture of polyester and nylon fibres, preferably non-woven.

BRIEF DESCRIPTION OF THE DRAWINGS

The invention is described, purely by way of example, with reference to the accompanying diagrammatic drawings, wherein:

FIG. 1a is a detail of FIG. 1 on an enlarged scale, FIG. 4 is a plan view of a second embodiment according to the invention, analogous to FIG. 1a.

Figure 1:
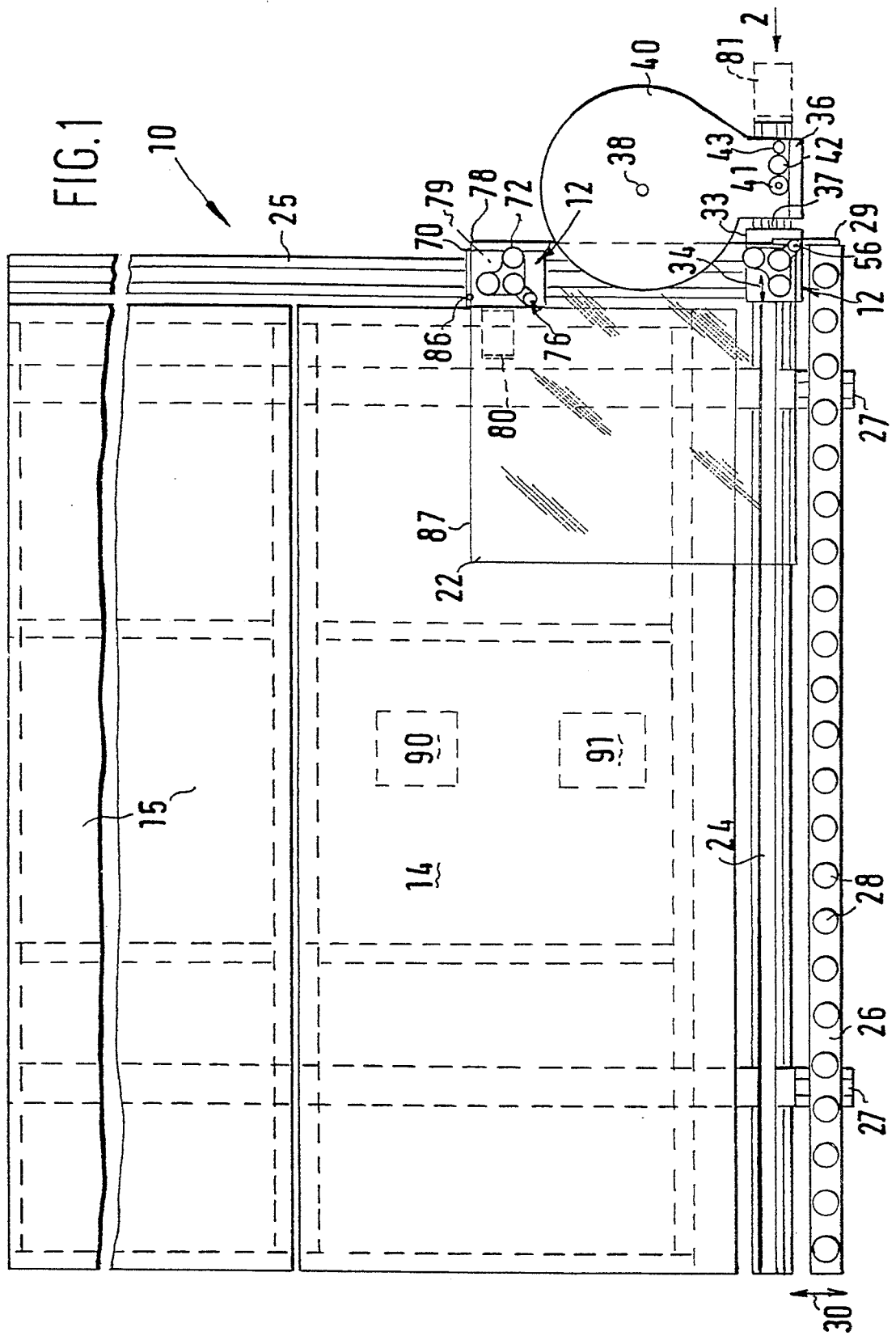
FIG. 1 is a plan view of apparatus according to a first embodiment of the invention in the form of a tilt applicator.

DESCRIPTION OF THE BEST MODE AND PREFERRED EMBODIMENTS:

Referring first to FIGS. 1, 1a, 2 and 3 of the drawings, there is shown a tilt applicator 10 with a mechanical sheet turner 12 embodying the invention. The tilt applicator 10 has a two-part, rectangular support bed 14, 15 of which the front part 14 (as viewed) can be raised and lowered between a fully vertical position at right-angles to the plane of FIG. 1 and a fully horizontal position as shown in FIG. 1 by hydraulic or pneumatic jacks not shown.

The bed 14, 15 is covered by a porous fibrous mat 16.

The mat 16 is permeable to air and is laid over an array of air-conducting apertures 18 connected to a schematically shown plenum chamber 19 which in turn is selectably connected via a change-over valve 20 to a suction pump P or to a compressed air blower B. In this way the bed 14, 15 may function either as a gripper for a sheet 22 of glass laid on it by holding the sheet 22 by suction, or alternatively as an air flotation bed, causing the sheet 22 practically to hover on a thin cushion of pressurised air, whereby to make the sheet, however large and heavy, easy to displace in translation and/or in rotation.

Along two sides of the bed 14, 15 respective slideways 24, 25 extend orthogonally to each other. Outboard of slide 24 is a rail 26 connected to the bed by way of slides 27 and carrying a row of tires or rollers 28 which may be freely rotatable or driven by a non-illustrated motor and which support the sheet 22 in a vertical position as it is transferred from the washing/drying stage of the above-described machine line. The right-hand end (as viewed in FIG. 1) of the rail 26 has a projecting flange 29 to provide a stop/datum edge for the sheet for the initial position in the sealing strip application cycle.

At the time of receiving a sheet 22, the air bed 14, 15 is in a blowing mode and the vertically oriented sheet 22 is essentially supported only by the tires 28. Then, when the sheet 22 has been "datumed" the rail 26 with the lyres 28 is moved out of the way (see the double-headed arrow 30) and then the bed is switched by way of the valve 20 to suction from pump P.

Figure 2:
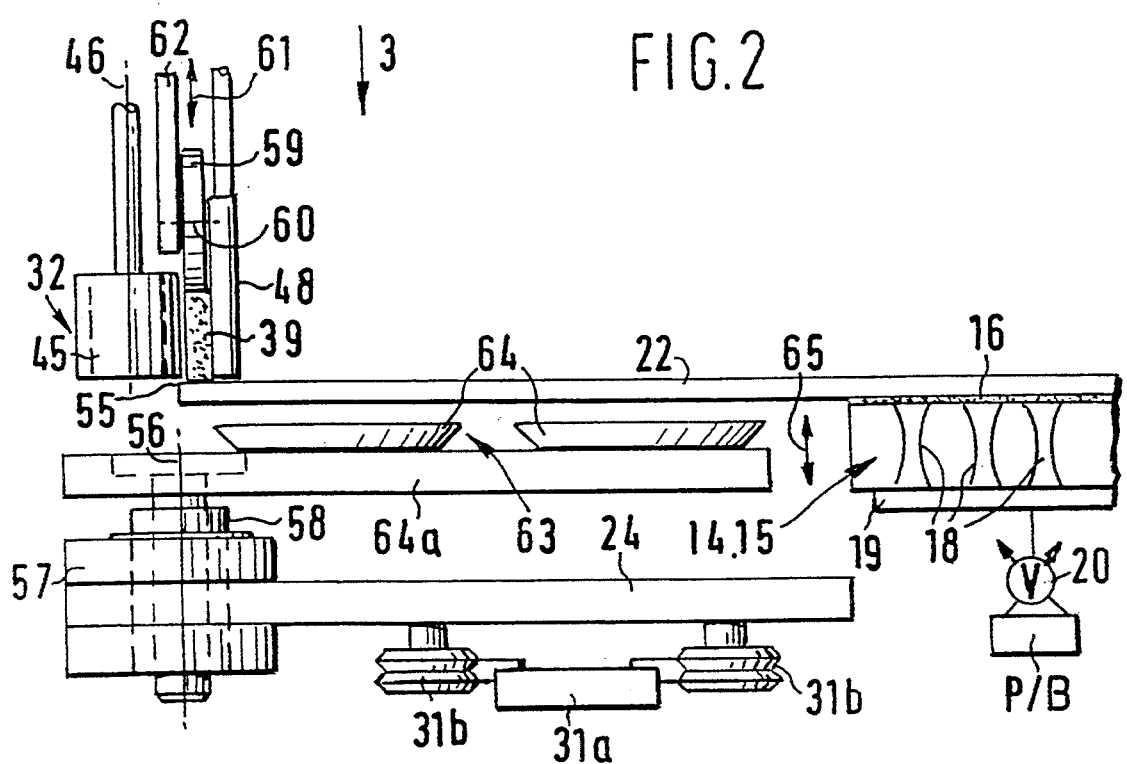
FIG. 2 is a fragmentary side elevation on an enlarged scale of the tilt applicator taken on the arrow 2 in FIG. 1 and illustrating in detail the sealing strip applicator and the suction cups.

The slides 24, 25 include slide plates 31a and metal wheels 31b (FIG. 2). The slide 24 carries a strip applicator head 32 on a carriage 33 movable along the directions indicated by a double-headed arrow 34. Also mounted on slide 24 is a further carriage 36 which is couplable to and decouplable from the carriage 33 by means of any suitable link 37. The carriage 36 carries a mounting 38 projecting from a platform 40 supporting a non-illustrated reel of sealing strip. The leading end of the sealing strip 39 is guided between a set of rollers 41, 42; the roller 41 has two sections of different diameter and the smaller section forms a nip for the strip with roller 42 while its larger section is in frictional drive engagement with roller 42. The nip is effective to separate the sealing strip from its backing sheet (not shown). The backing sheet is then guided between the nip of roller 42 and a further, smaller diameter roller 43 towards a non-illustrated cutter and collector. The roller 41, 43 are in frictional engagement and guide the leading end of the sealing strip 39 (FIGS. 2 and 3) towards the applicator head 32.

It should be mentioned that sealing strips come in a large variety of thicknesses and lengths. Some are sold in bobbin form and would be too heavy for mounting on a carriage like carriage 36; they therefore require a different form of seating strip feeder but no such feeder is described herein, as this is not an essential part of the invention.

Figure 3:
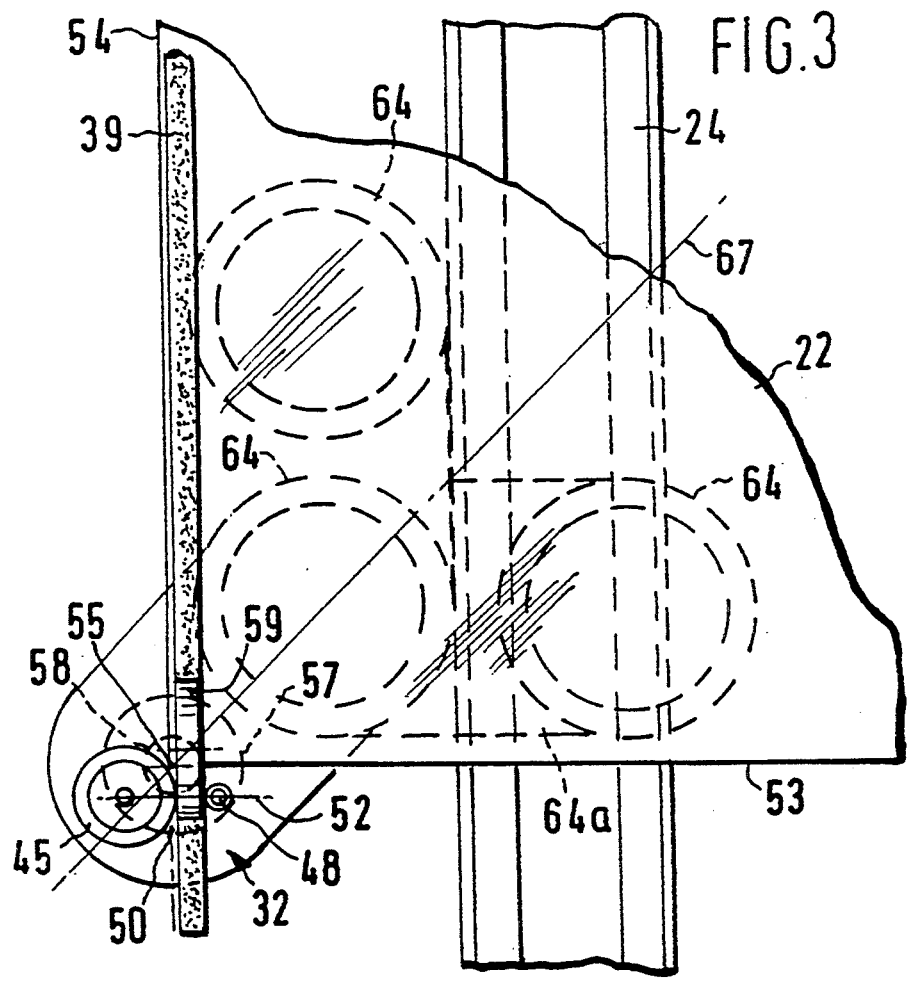
FIG. 3 is a plan view of the fragment shown in FIG. 2, and taken on the arrow 3 in FIG. 2.

The head 32 has a portion disposed above the horizontal datum plane of the glass sheet 22 and a portion disposed below that plane (FIG. 2). The top portion is not shown for the sake of clarity in FIG. 1. It has a guide roller 45 freely rotatable about a vertical axis 46 and a freely rotatable pin 48, substantially vertical as shown, these parts defining a gap 50 through which is threaded the leading end of the sealing strip 39. As shown in FIG. 3, the imaginary horizontal line 52 passing through the axes of the roller 45 and the pin 48 lies outside of, but is parallel to, the datumed edge 53 of the sheet 22 of the glass while the edge 54 of the sheet 22 perpendicular to the edge 53 extends very slightly beyond (beneath) the sealing strip 39. The axes (positions) of the roller 45 and pin 48 are adjustable e.g. by non-illustrated screws, whereby the distance between the line 52 and the edge 53 may be varied to accommodate sealing strips 39 of different thicknesses. The corner 55 between edges 53, 54 lies thus above (as viewed in FIG. 3) the line 52 and somewhat outside the gap 50. This corner 55 lies on the pivot axis 56 of a boss 57 carrying a ball bushing 58 which will be referred to again below. However, the pivot axis 66 need not wholly coincide with the corner 55, thus e.g. as seen in FIG. 2 it may be up to 10 mm "inboard", i.e. to the right of its illustrated position in that FIGURE.

The portion of the applicator head 32 above the sheet 22 furthermore includes a roller or edge wheel 59 rotatable about a horizontal axis 60 and raisable/lowerable along the directions illustrated by a double-headed arrow 61 by being carried on a plate 62 that is in turn connected to a non-illustrated pneumatic ram of adjustable stroke. In its lowered position the edge wheel 59 rests with predetermined pressure on top of the sealing strip 39 so as to press it to the glass sheet 22.

The portion of the applicator head 32 below the sheet 22 has a suction cup assembly 63 comprising three suction cups 64 arranged in a 'clover-leaf' formation and mounted for horizontal pivotal movement on a bracket 64a pivotally mounted on the boss 57 and bushing 58 for pivotal as well as reciprocating vertical movement, the latter being shown by the broken lines and by the double-headed arrow 65 to approach or move away from the sheet 22. The means for effecting these movements of the cups 64 are not shown in detail: any suitable means such as pneumatic piston-and-cylinder unit may be used. The pivot axis 56 lies on the 45° bisector line, shown at 67, of the corner 55 of the sheet 22.

Referring to FIG. 1, it will be seen that a carriage 70 is mounted on the slide 25. The carriage 70 carries a suction cup assembly 72 similar to assembly 63. Again, a cloverleaf configuration of suction cups 74 may be seen. The pivot point is indicated at 76 and the bisector line passing through the far corner 78 of the sheet 22 is designated by 79. As before, the suction cup assembly 72 rotates in a horizontal plane on a non-illustrated ball bushing similar to bushing 58 which also permits the assembly 72 to be moved up-and-down by means of a pneumatic piston-and-cylinder (not shown).

The assembly 72 is driven along the slide 25 (in a North-South direction as viewed) by means of a stepper motor 80 and is fitted via a leadscrew with a pinion 82 which meshes with a fixed rack 84. The carriage 70 includes a sensor, e.g. an optical sensor 86 to detect the far edge 87 of the sheet 22 of glass and stop the motor 80.

In operation, a sheet 22 of glass is manoeuvred into its initial, "datumed" position supported by an air flotation bed 14, 15. When in the correct position the sheet 22 is held there by reversing the air flow and causing the air flotation bed to suck.

The suction cup assembly 72 is then automatically driven until it is located in its correct position beneath the far right-hand corner 78 of the glass. Meanwhile, the carriage 33 with the applicator head 32 coupled to the suction cups 64 under the sheet of glass 22 and the carriage 36 are positioned either manually or by being mechanically driven by e.g. motor 81 over the near left-hand corner (as viewed) to begin applying the strip seal 39. As the head 32 is moved to the right, the strip seal 39 is applied by edge wheel 59 to the near edge 54 of the glass. When the head 32 reaches the end of its stroke both suction cup assemblies 63, 72 are raised and brought into contact with the lower surface of the glass sheet 22 and suction applied to it via the cups 64, 74. Suction is then released from the bed 14, 15 and air flotation applied via blower B, apertures 18 and mat 16. Suction cup assembly 72 is now driven towards the front of the machine (towards the bottom of FIG. 1) while the head 32 and suction cup assembly 63 are moved to the left, as viewed in FIG. 1, either manually or automatically. This results in the glass being rotated clockwise through 90 degrees and the strip seal 39 being formed around the corner 55 of the glass sheet 22. The relative positions of the line 52 and the corner 55, i.e. the positions of the roller 45 and pin 48 give rise to a crisply made corner of the sealing strip 39, by pivoting the glass.

The air to the bed 14, 15 is again reversed, stopping the air flotation and sucking the glass sheet 22 to grip it in position. Suction is removed from both suction cup assemblies 63, 72 so that they are released and assembly 72 is driven by the stepper motor 80 and guided by sensor 86 to find its position under the far right-hand corner of the glass sheet 22 while the head 32 is moved to the right in FIG. 1 to apply the strip seal 39 along, what is now the new near edge of the glass sheet 22.

The process is repeated four times so that the strip seal 39 is applied all around the perimeter of the rectangular piece of glass 22.

The apparatus is associated with respective control units 90, 91 for appropriate electrical and pneumatic circuitry for the appropriate and sequential performance of the various movements described.

Figure 4:
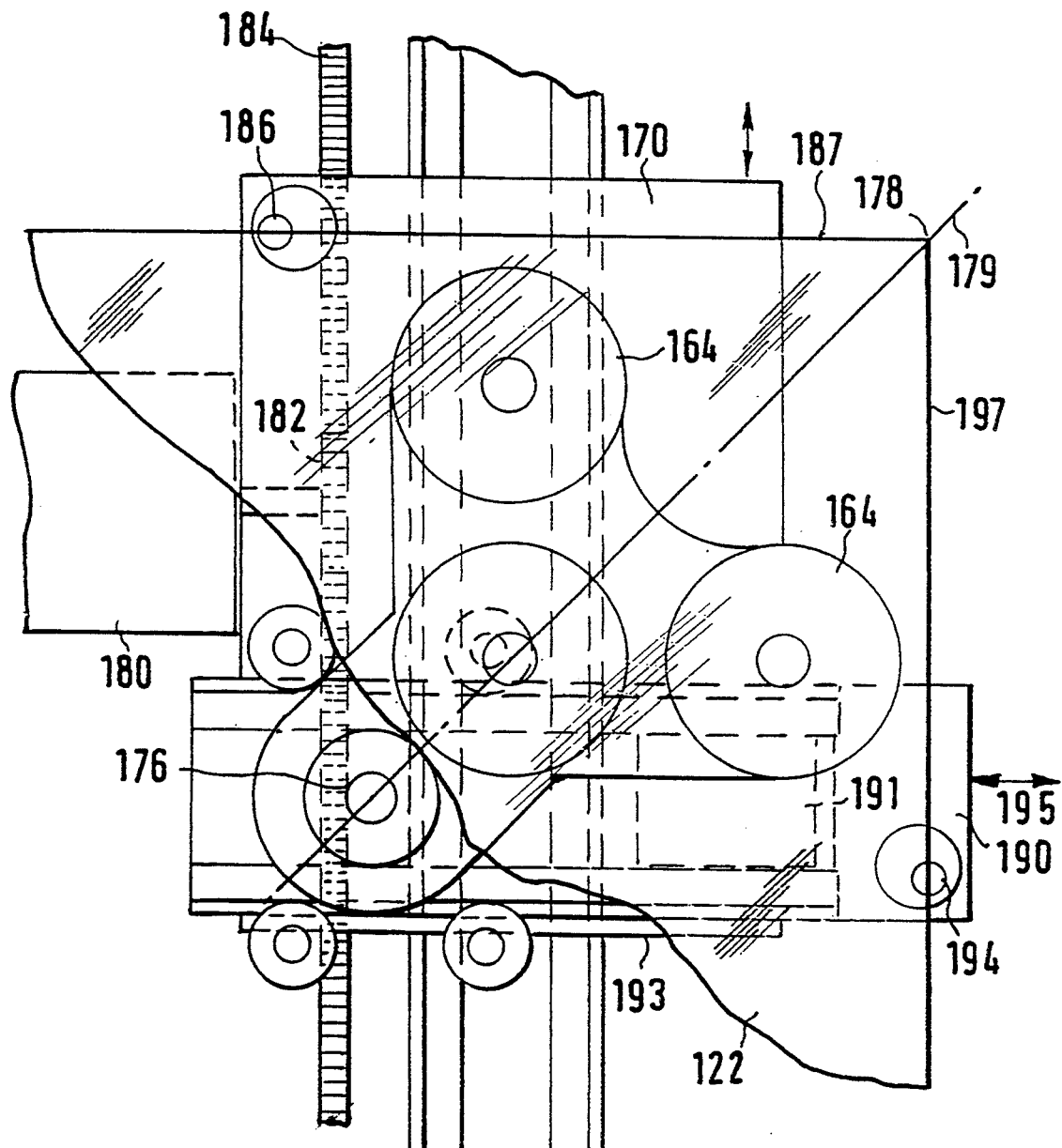

FIG. 4 illustrates an embodiment of the invention particularly suitable to accommodate glass sheets which are "out-of-square". Only those parts of the apparatus according to FIG. 4 will be described which differ from the embodiment of FIGS. 1–3, and like or functionally equivalent parts have been designated by the same reference numbers as those of the previous embodiment but with 100 added.

In the apparatus according to FIG. 4 the suction cups 164 are not mounted directly on carriage 170. Instead, they are mounted on a second carriage 190 drivable by a stepper motor shown schematically at 191, but mounted on carriage 170, via leadscrew along a slideway 193 (in an East-West direction, as viewed) over a limited range of movement, e.g. 10–30 min. The carriage 190 is provided with a sensor, e.g. a photosensor, 194.

In use, a motor 180 (here a DC servo-motor) drives the carriage 170 to be disposed in the vicinity of and under the corner 178 of a sheet of glass 122 at the desired position determined by the sensor, e.g. photosensor, 186. This is sufficient to determine the position of the "North" edge 187 of the sheet 122 but of course if the sheet 122 is out-of-true, e.g. has the shape of a parallelogram rather than a square or a rectangle, then the far corner 178 will not lie on the true bisector line 179. The subsequent operation involving the suction cups 164 and turning the sheet 122 will produce cumulative errors. Hence there is a need also to detect, and if necessary to correct, the position of the "Eastern" edge 197 of the sheet 122.

Accordingly, the second carriage 190 is driven by the stepper motor 191 by a small amount along the "East-West" direction of the double-headed arrow 195, as determined by photosensor 194, until the sheet 122 is correctly datumed and the pivot point for the suction cups 164 lies correctly on the bisector line 179. Thereafter, the cups 164 are attached by suction to the sheet of glass 122 the latter is turned, substantially all as before, except that carriage 190 is driven by the motor to a central datum position.

It will be seen that the preferred embodiments described above achieve the aims enumerated at the outset.

It should be appreciated that while the above preferred embodiment has been described with reference to sealing strip sealants as manufactured by Tremco Manufacturing Inc., the invention may be used, or be readily adapted for use, with other sealants and indeed with liquid adhesives extruded into strip form or dispensed as a bead or strip, when in use, and accordingly the phrase "material of strip form" in the claims should be so construed.

Although a clover leaf trio of suction cup assembly is preferred, other suction means and/or suction cup(s) in other configurations may be employed. Moreover, suction is a preferred and elegant way of implementing the function of gripping the workpiece, other e.g. mechanical grippers are certainly conceivable and are intended to be within the scope of the invention.

I claim:

1. Apparatus for turning a sheet-like workpiece, comprising supporting means (14, 15) for supporting the workpiece (22, 122) in a given plane, two mobile gripping means (63, 72, 163) each of which includes at least one suction cup (64, 164) and which are selectably activatable to grip or release respective adjacent corner regions of said workpiece, characterized by means defining mutually orthogonal, linear displacement paths (24, 25) for said mobile gripping means (63, 163), and respective means (80) for effecting linear displacement of said gripping means (63, 72, 163) along said paths while being activated to grip said workpiece (22, 122).

2. Apparatus according to claim 1, characterized in that an applicator (32) of material (39) of strip form is mounted on one of said paths (24) for movement therealong with or independently of the respective gripping means (63, 72, 163) associated with said path (24), said applicator (32) being operable to apply an initial strip (39) of material along one edge (54) of said workpiece (22, 122) by moving in a first direction from one corner region (78, 178) of said workpiece (22, 122) to the opposite corner region along said edge (54).

3. Apparatus according to claim 2, characterized in that means are provided to keep said applicator (32) stationary relative to said opposite corner region while said gripping means (63, 72, 163) are activated, the gripping means (63, 72, 163) being reciprocatable orthogonally relative to the plane of said workpiece (22, 122).

4. Apparatus according to claim 1, characterized in that said supporting means is a support bed (14, 15) for holding said workpiece in a desired position and is provided with a plurality of air flow apertures (18), and further characterized in that said apertures of the support bed (14, 15) are connected to a change-over valve (20) selectively connectable to a source of suction or to a blower (B), and in that control means are provided which are effective so to control said valve (20) and said gripping means (63, 73, 163) such that when the support bed (14, 15) is connected to the blower (B) to air-float said workpiece (22, 122), said gripping means (63, 72, 163) are activated to grip said workpiece (22, 122).

5. Apparatus according to claim 1, characterized in that at least one of said gripping means 64, 164) is mounted to be driven on a carriage (70, 170) which carries a sensor (86, 186) to detect the position of an edge of said workpiece (22, 122).

6. Apparatus according to claim 5, characterized in that one of said gripping means is mounted on a first carriage (170) and another said gripping means is mounted on a second carriage (190) which carries a sensor (193) for detecting the corner (178) of said workpiece (122) and in that driving means (180) are provided for driving said second carriage (190) to a limited extent in a direction orthogonal to the direction of displacement of said first carriage (170).

7. Apparatus according to claim 1, wherein each mobile gripping means includes a plurality of said suction cups (64, 164), the suction cups of each gripping means being disposed in a group having a "cloverleaf" configuration, each group (63, 72) being mounted for pivotal movement about a respective axis extending perpendicularly of said workpiece (22, 122) and passing through a respective corner region (78, 178) thereof.

8. Apparatus according to claim 2, characterized in that said applicator (10) comprises a first roller (45) freely rotatable about an axis perpendicular to the plane of said workpiece (22, 122), a pin (48) parallel with said axis and defining a gap between itself and said first roller (45) for guiding the material (39) of strip form, and a second roller (59) rotatable about an axis parallel with the plane of the workpiece (22, 122), the second roller (59) being raisable and lowerable respectively to release, and engage with pressure, said material (39) for pressing said material (39) against said workpiece (22, 122).

9. Apparatus according to claim 4, characterized in that said support bed (14, 15) is covered by a porous mat (16).

10. Apparatus according to claim 2, characterized by a mounting (38) for a reel of said material (39), said mounting (38) being on a further carriage (36), and by rolling elements (41, 42, 43) which, or some of which, are frictionally engaged with each other for entraining said material (39) therearound.

* * * * *